J. J. WOOD.
EDGEWISE WINDING MACHINE.
APPLICATION FILED OCT. 2, 1907.

919,510.

Patented Apr. 27, 1909.
4 SHEETS—SHEET 1.

Witnesses:
Lloyd C. Bush
J. Ellis Glen

Inventor:
James J. Wood,
By Albert G. Davis
Atty.

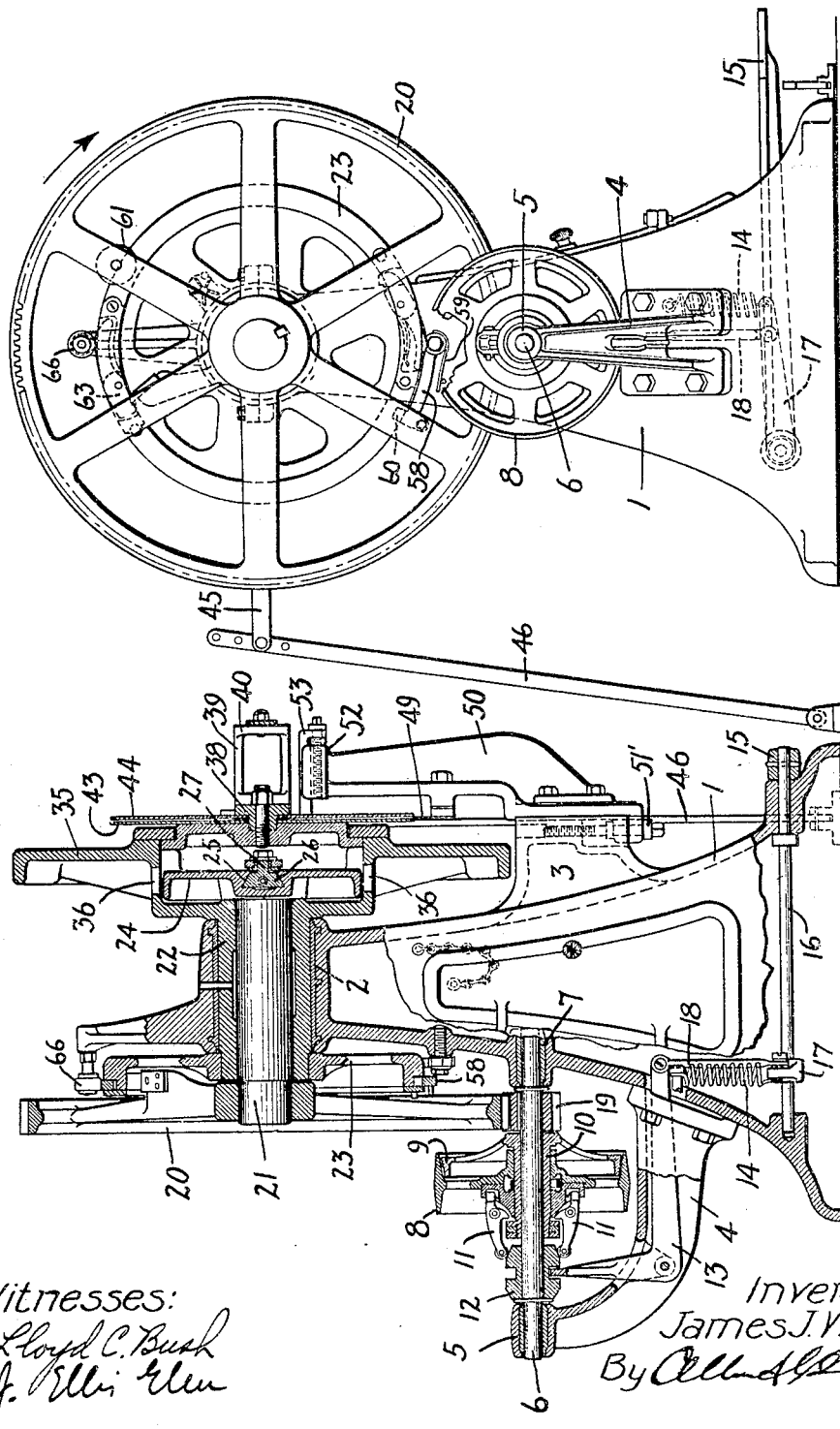

J. J. WOOD.
EDGEWISE WINDING MACHINE.
APPLICATION FILED OCT. 2, 1907.
919,510.
Patented Apr. 27, 1909.
4 SHEETS—SHEET 3.
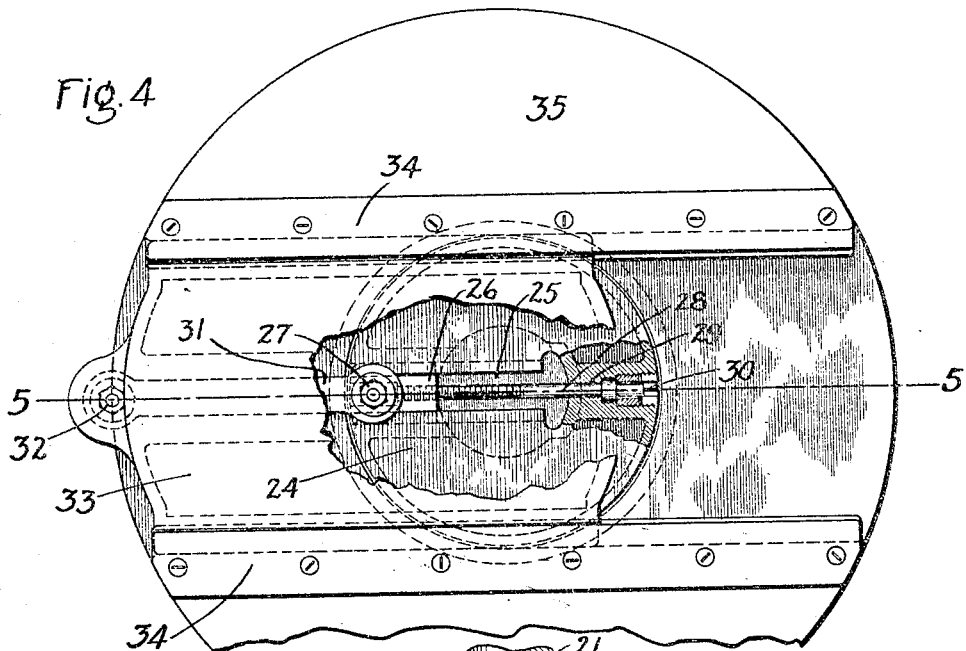
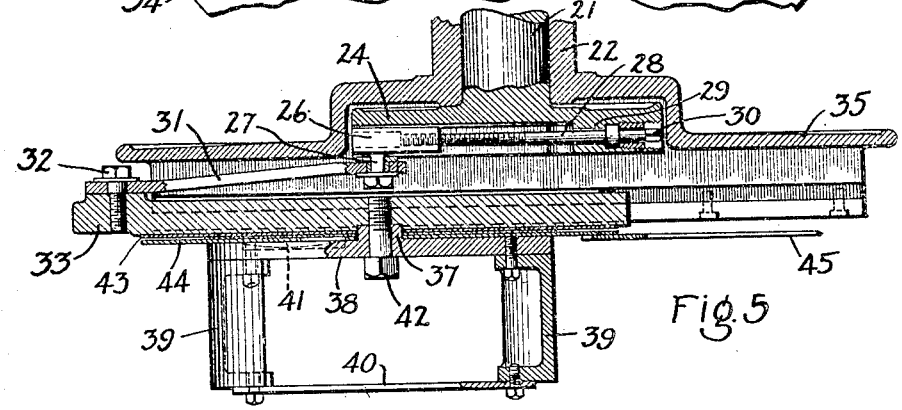
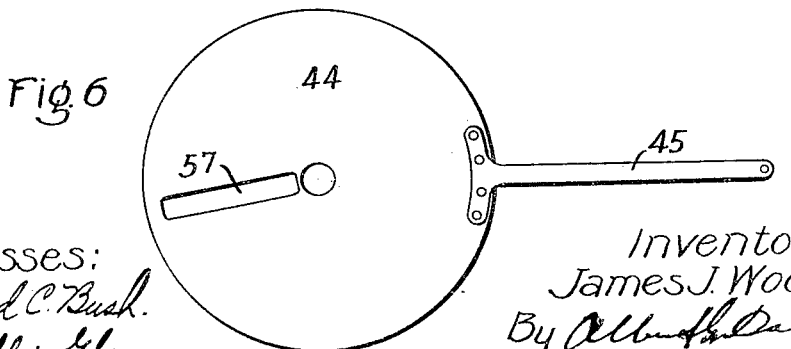
Witnesses:
Lloyd C. Bush.
J. Ellis Glen
Inventor:
James J. Wood,
By Albert H. Davis
Att'y.

J. J. WOOD.
EDGEWISE WINDING MACHINE.
APPLICATION FILED OCT. 2, 1907.
919,510.
Patented Apr. 27, 1909.
4 SHEETS—SHEET 4.
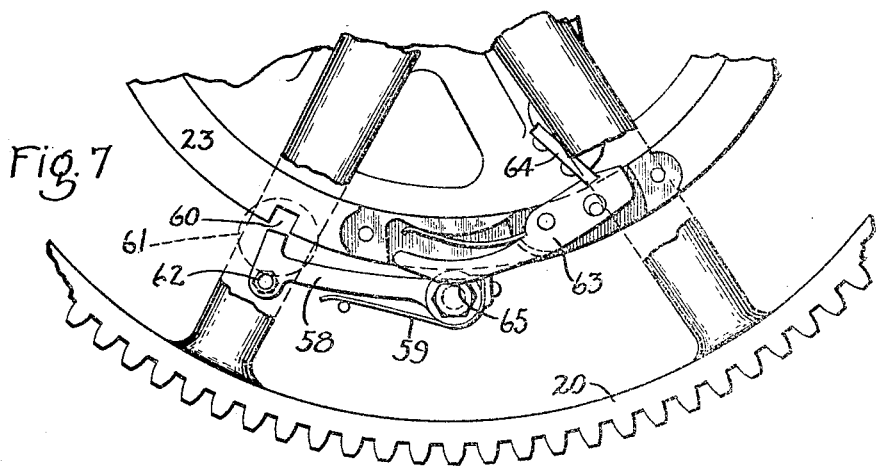
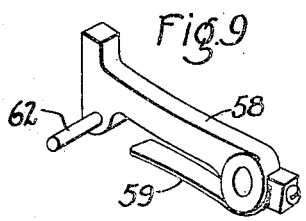
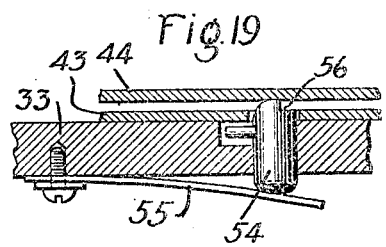
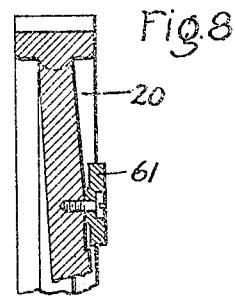
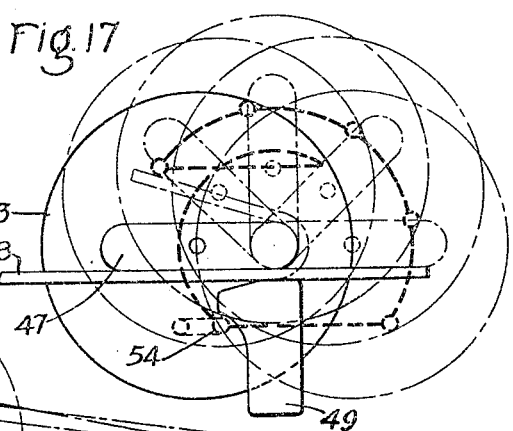
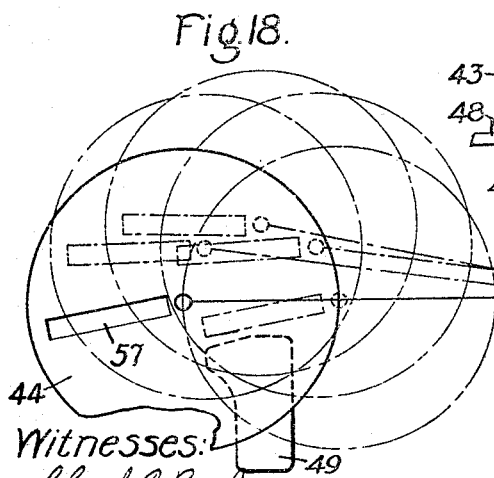
Inventor:
James J. Wood
By Allen H. Davis
Atty.
Witnesses:
Lloyd C. Bush
J. Ellis Glen

UNITED STATES PATENT OFFICE.

JAMES J. WOOD, OF FORT WAYNE, INDIANA.

EDGEWISE-WINDING MACHINE.

No. 919,510.  Specification of Letters Patent.  Patented April 27, 1909.

Application filed October 2, 1907. Serial No. 395,470.

*To all whom it may concern:*

Be it known that I, JAMES J. WOOD, a citizen of the United States, residing at Fort Wayne, county of Allen, State of Indiana, have invented certain new and useful Improvements in Edgewise-Winding Machines, of which the following is a specification.

This invention relates to what are commonly known as edgewise winding machines, by means of which a relatively thin strip of metal is bent about an axis perpendicular to the plane of said strip. Such a machine is shown in the patent to John Riddell, No. 678,280. Edgewise-wound coils of flat, ribbon-like conductors are used very extensively at the present time in electrical apparatus, and especially in the field magnets of generators and motors.

The object of my invention is to simplify the Riddell machine, so as to produce quickly and inexpensively, from a continuous length of metallic ribbon, coils of various sizes having semicircular ends and straight sides.

To this end the invention consists in a machine in which a suitable coil-former is rotated intermittingly through 180 degrees to form the semicircular ends of the coil, and between each of such half revolutions is moved lengthwise a distance corresponding with the desired length of the straight sides of the coil. The movements are performed automatically and continuously by a comparatively simple construction and arrangement of parts, as hereinafter set forth.

Figure 1:
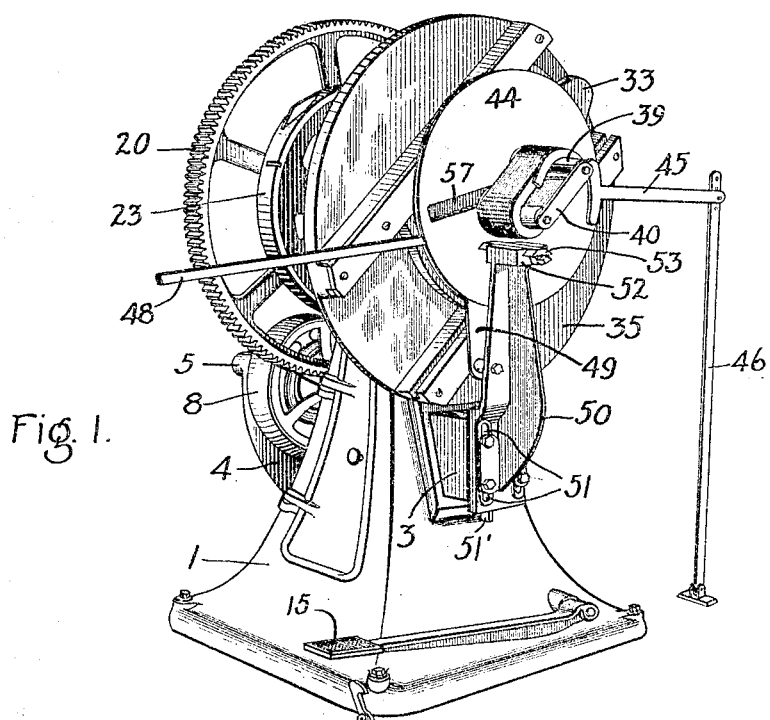

In the accompanying drawings, Figure 1 is a perspective view of a machine embodying my invention; Fig. 2 is a side elevation of the same, partly in section; Fig. 3 is a rear elevation, with the belt-pulley slightly broken away; Fig. 4 is a front elevation of the winding head, partly in section, and minus the coil-forming parts; Fig. 5 is a section of the same on the line 5—5, Fig. 4, with the coil-forming parts restored; Fig. 6 is an elevation of the front presser plate; Fig. 7 shows the locking dog and clutch; Fig. 8 is a section of a portion of the main gear wheel showing the dog-operating roller in section; Fig. 9 is a perspective view of the locking-dog; Figs. 10 to 16 inclusive show the successive positions of the coil-former carriage in making one revolution; Figs. 17 and 18 are diagrams showing the motion of the coil-forming parts; and Fig. 19 is a section of the carriage showing the starting-pin.

The frame of the machine comprises a pedestal 1, which tapers upwardly from a broad base and has a horizontal shaft-bearing 2 at its upper end running from front to rear. On the front of the pedestal is an integral block 3 having a vertical front face. Secured to the rear of the pedestal is a bracket 4 which carries an outboard journal-bearing 5 for one end of the driving-shaft 6, whose other end is journaled in a bearing 7 in the rear wall of the pedestal.

The driving-shaft carries a belt-pulley 8 which can be connected to and disconnected from the shaft by a suitable clutch; preferably a friction clutch comprising a conical drum 9 to grip a conical surface on the pulley 8, a sleeve 10 carrying said drum and keyed to the shaft and on which the pulley is loosely journaled, levers 11 for forcing said drum and pulley together, and a sliding conical cam 12 for actuating said levers. The cam is moved to and fro by a lever 13 fulcrumed on the bracket 4 and engaged by a spring 14 which holds the clutch normally open. A foot treadle 15 is connected with the lever, as by means of the rock shaft 16, rock-arm 17 and link 18, and by means thereof the operator can throw in or disengage the clutch at will.

The driving-shaft carries a pinion 19 meshing with a spur-gear 20 which is secured on a shaft 21 journaled in a tubular shaft 22 which in turn is journaled in the bearing 2 at the upper end of the pedestal. Secured to the tubular shaft 22 is a circular cam-wheel 23, somewhat smaller in diameter than the spur-gear 20, beside which it stands. The spur-gear revolves continuously, but the cam-wheel can be clutched to the spur-gear during a half revolution, and unclutched therefrom and held stationary during the other half of said revolution. The spur-gear shaft 21 carries at its other end a crank disk 24, having a diametrical undercut groove 25 extending more than half way across it. A block 26 has a sliding fit in said groove and carries a crank-pin 27. By means of a screw 28 tapped into said block and rotatable in a bearing 29 at one end of said groove, the crank-pin can be adjusted radially on the disk 24. The screw has a squared end 30 to receive a socket wrench for turning it.

The crank-pin is connected by a pitman 31 with a wrist pin 32 in one end of a carriage 33 adapted to slide in parallel ways 34 extending across the face of a circular face-plate 35 mounted on the tubular shaft 22. The face-plate has a dished or sunken central portion in which the crank-disk revolves. One or more openings 36 are made in the wall of this portion to give access to the adjusting screw 29. The face-plate stands sufficiently in front of the crank-disk to enable the carriage to slide to and fro without difficulty.

The coil-forming and supporting mechanism is mounted on the carriage 33. At a point in said carriage coincident with the axis of the crank-pin when the latter is at either end of its stroke—that is, for instance, when the carriage is in the position shown in Fig. 4—a counterbored hole is drilled to receive the hub 37 on the base-plate 38 of the coil-support. Said support comprises also semicircular end pieces 39, and a tie-plate 40 attached to the outer ends thereof. The base-plate has on each side near its respective ends a beveled lip 41. A bolt 42 passes through the base-plate and hub and is tapped into the counterbored hole in the carriage.

The hub 37 on the coil-support is long enough to afford a certain space between the carriage and the base of said support. In this space are located the coil-forming devices. A circular rear presser-plate 43 is rigidly secured to the carriage, with its center coincident with the axis of the hub 37. A circular front presser-plate 44 is superimposed on the rear plate, being journaled centrally on said hub, and prevented from rotating by a radius rod 45 extending from said plate and pivoted to a vibratory standard 46 erected near the pedestal 1.

On the rear presser-plate is secured the coil-former 47, which is a thin steel plate of the shape desired, having semicircular ends and straight sides. The coil-former is removable, so that it can be replaced by another of the same size in case it wears out, or by one of a different size if a different sized coil is to be wound. One of the semicircular ends of said coil-former is arranged concentric with the axis of the shaft 21. The front presser-plate lies against the front of the coil-former, whose thickness is that of the copper strip or ribbon 48 which is to be wound edgewise. Said former thus spaces the presser-plates apart just far enough to permit the strip 48 to be fed in between them and be held by said plates from warping or twisting. Between the presser-plates is inserted a stationary abutment 49 consisting of a thin steel plate of the same thickness as the coil-former having a horizontal upper edge standing below the coil-former a distance equal to the width of the copper strip 48. The abutment is firmly bolted at its lower end to an arm 50 fastened to the block 3 on the pedestal. The arm is slotted at 51 to enable it to be vertically adjustable, as by means of the screws. At the upper end of the arm is a support 52 having an undercut groove parallel with the axis of the shaft 21 and serving as a guide for an adjustable pressure-slide 53 whose upper surface stands just under the coil-support at a distance therefrom equal to the width of the copper strip.

When the coil is first started, means must be provided to carry the end of the strip around the coil-former during its first revolution. This consists preferably of a pin 54 inserted in a socket in the carriage 33 and projecting through a hole in the rear presser-plate. A spring 55 urges it yieldingly against the inner surface of the front presser-plate. The head of the pin is cut away on one side to form a shoulder 56, and its surface is beveled or rounded, as shown. The starting-pin describes the path shown in heavy dotted lines in Fig. 17. After the first revolution of the coil-former, said pin is no longer in service, but slides along the inner surface of the front presser-plate, yielding back into its socket as it passes under the strip 48 and the abutment 49.

After the coil-former has made its first revolution, the convolution of the strip wound around it must be removed to make room for the next convolution. This is accomplished by leading the strip through a radial slot 57 in the front presser-plate and receiving the formed convolution upon the coil-support, which registers with the coil-former. As turn after turn emerges from the slot, the coil slowly slides out upon the support until it reaches the proper size.

In order to wind the coil, the carriage and coil-former must be alternately slid lengthwise and given a half revolution. The sliding movement is effected by a half revolution of the crank disk, during which time the face-plate is stationary. The turning movement is effected by clutching the cam-wheel and spur-gear together, so that the face-plate and crank-disk rotate in unison during the other half revolution of the crank-disk. The stopping and clutching devices will now be described.

Pivoted to the back of the pedestal is a dog 58 which is urged by a spring 59 against the periphery of the cam-wheel 23, so that it will engage with one or the other of two diametrically opposite sockets 60 in the periphery of said wheel when said socket registers with said dog. The sockets are so located that the wheel will be thus locked and held stationary when the carriage-way in the face-plate is horizontal.

The dog can be tripped by the spur-gear 20 at a certain point in each revolution of said gear. To effect this, I prefer to use a roller 61 pivoted to the side of said gear and adapted to strike on and press down a pin 62 projecting laterally from said dog, as shown in Figs. 7 and 9. At the instant that the dog is disengaged from the cam-wheel, a clutch connects said wheel with the constantly rotating spur-gear. This consists preferably of a cam-lever 63 pivoted in a recess in the cam-wheel and having a notched end urged by a spring toward a blade 64 secured to the side of the spur-gear. The blade engages the end of the cam-lever, raises it, and snaps into the notch in said lever just as the dog is withdrawn from the socket 60. The cam-wheel is carried with the spur-gear until the latter has made a half revolution, at which point a cam-surface 65 on the lever 63, protruding beyond the periphery of the cam-wheel, is engaged by a stationary tappet roller 66 mounted on the pedestal. The tail of the cam-lever is pressed inwardly, and its opposite notched end is lifted off the blade 64, thereby unclutching the cam-wheel from the spur-gear. At the same instant the opposite socket 60 reaches the dog 58 and the cam-wheel is thereby again stopped and held stationary. There are two cam-levers, diametrically opposite, so that when one is disengaged the other is always in position to re-clutch the spur-gear when the blade 64 reaches it.

Figure 10:
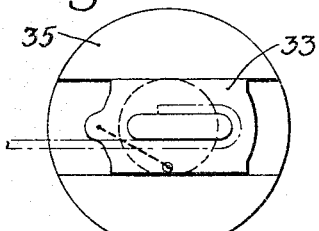
Figure 11:
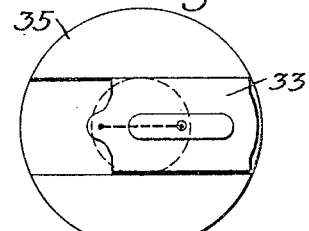
Figure 12:
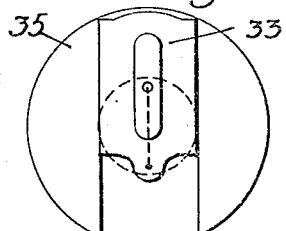
Figure 13:
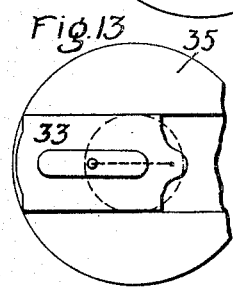
Figure 14:
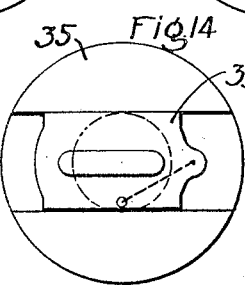
Figures 15, 16:
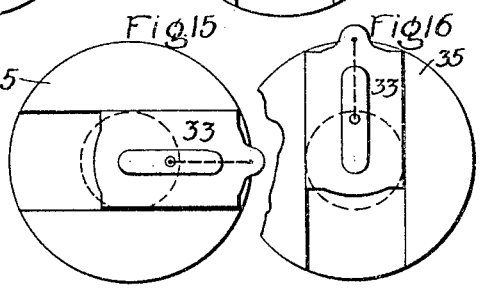

The operation of the machine is as follows: Assuming that the carriage is at the left-hand side of the machine, as shown in Figs. 4 and 17, with the starting-pin 54 below the coil-former, the copper strip is thrust in between the presser-plates and between the former and the abutment 49. The machine is then started, and as the cam-wheel is locked, the rotary movement of the crank-disk slides the carriage to the right-hand end of its stroke, as shown in Figs. 10 and 11. Here the cam-wheel becomes clutched to the spur-gear, and the face-plate makes a half revolution, as shown in Figs. 12, 13 and 17. The shoulder on the starting-pin engages the edge of the copper strip, and carries it over with the coil-former, which revolves on the axis of one of its semicircular ends, the same coinciding with the axis of the shaft 21. The abutment keeps the strip pressed closely to the edge of the coil-former. During this half of the revolution of the spur-gear, the carriage is returned to the left-hand side of the machine, but is turned end-for-end as shown in Fig. 13. The continued rotation of the crank-disk now draws the carriage to the right again, as shown in Figs. 14 and 15, during which time the copper strip is drawn in between the presser plates and over the abutment. Another half revolution of the face-plate, as shown in Fig. 16, restores the carriage to its original position (Fig. 4) and makes another bend in the strip 48. By this time the strip 48 has been bent around both ends of the coil-former, and in order to permit the further operation of the machine, the end of said strip is led out through the slot 57 in the front presser-plate. This plate does not revolve, but serves to lift off the formed convolution from the coil-former and guide it over the beveled lip 41 to the coil-support which rotates with the coil-former and registers therewith. Four several positions of this plate are shown in Fig. 18, corresponding with four similar positions of the rear presser-plate shown in Fig. 17. The pressure-slide keeps the convolutions of the coil pressed close against the support, and assists in shaping them and in sustaining their weight. The continued operation of the machine winds the strip edgewise around the coil-former into an elongated helical coil of any desired number of turns, the successive turns being lifted off the coil-former, as each is wound, and forced out upon the coil-support by the slot in the front presser-plate.

What I claim as new and desire to secure by Letters Patent of the United States, is,—

1. An edgewise winding machine, comprising a pedestal having a horizontal shaft-bearing at its upper end, two concentric shafts journaled in said bearing, means for driving one of said shafts, means for clutching the second shaft thereto during a half revolution, means for holding said second shaft stationary during the other half revolution, and coil-forming mechanism actuated by said shafts.

2. An edgewise winding machine, comprising a pedestal having a horizontal shaft-bearing at its upper end, two concentric shafts journaled in said bearing, a spur-gear on one of said shafts, a driving pinion meshing with said spur-gear, a wheel on the second shaft, automatic clutching devices carried by said gear and wheel, means for unclutching said gear and wheel at the end of a half revolution in unison, means for locking said wheel stationary during the next half revolution, and coil-forming mechanism carried by said shafts.

3. An edgewise winding machine, comprising two concentric shafts, a spur-gear on one of said shafts, a driving pinion meshing with said spur-gear, a wheel on the second shaft, levers pivoted to said wheel at diametrically opposite points and each containing a notch, a blade on said spur-gear to engage with said notch, and a stationary tappet to actuate said lever and disengage it from said blade.

4. An edgewise winding machine, comprising two concentric shafts, a spur-gear on one of said shafts, a driving pinion meshing with said spur-gear, a wheel on the second shaft having two sockets at diametrically opposite points, a dog adapted to engage with said sockets, a projection on said spur-gear to disengage said dog, clutching devices adapted to connect the spur-gear and wheel at the instant the dog is withdrawn, and means for opening said clutch at the instant the dog enters a socket.

5. An edgewise winding machine, comprising two concentric shafts, a face-plate on one of said shafts having a sunken central portion, parallel ways extending across said face-plate, a carriage slidable in said ways, a crank-disk mounted on the other shaft and located in said sunken portion of the face-plate, and operating connections between said crank-disk and said carriage.

6. An edgewise winding machine, comprising two concentric shafts, a face-plate on one of said shafts having a sunken central portion, parallel ways extending across said face-plate, a carriage slidable in said ways, a crank-disk mounted on the other shaft and located in said sunken portion of the face-plate, operating connections between said crank-disk and said carriage, means for rotating said crank-disk continuously, and means for giving the face-plate a half revolution during alternate half revolutions of said crank-disk.

7. An edgewise winding machine, comprising a horizontal shaft, a rotatable face-plate mounted thereon, ways extending across said face-plate, a carriage slidable in said ways, a crank-disk for moving said carriage, a coil-former mounted on said carriage, a coil-support also mounted thereon and registering with said coil-former, and presser-plates between said coil-former and coil-support.

8. An edgewise winding machine, comprising a pedestal, a horizontal shaft journaled therein, a rotatable face-plate secured to said shaft, a carriage adapted to slide across the same, a rear presser-plate secured to said carriage, a coil-former fastened to said presser-plate, a coil-support having a hub passing centrally through said plate, a front presser-plate centrally journaled on said hub, and an abutment supported on said pedestal and extending up between said plates.

9. An edgewise winding machine, comprising a pedestal, a horizontal shaft journaled therein, a rotatable face-plate mounted on said shaft, a carriage adapted to slide across the face-plate, a crank-disk for actuating it, a rear pressure-plate secured to said carriage, a coil-former fastened to said presser-plate so that one end will be concentric with the axis of rotation of said face-plate when the carriage is at either end of its stroke, a coil-support registering with said coil-former and having a hub passing through the center of said coil-former and the rear presser-plate, and a front presser-plate centrally journaled on said hub and having a radial slot adjacent to one edge of the coil-support.

10. In an edgewise winding machine, the combination with rear and front presser-plates, of a coil-former fastened to said rear plate, and a starting-pin projecting through said rear plate and having a shoulder.

11. In an edgewise winding machine, the combination with a rotatable face-plate, of a carriage slidable thereon, a rear presser-plate secured thereto, a coil-former fastened to said presser-plate, a radially-slotted front presser-plate resting against said coil-former, a starting pin seated in a socket in said carriage and having a shouldered and beveled end projecting through said rear presser-plate, and a spring urging said pin against said front presser-plate.

In witness whereof, I have hereunto set my hand this 19th day of September, 1907.

JAMES J. WOOD.

Witnesses:
W. H. CRIGHTON,
LOUIS L. MILLAR.